(12) United States Patent
Ivanchenko et al.

(10) Patent No.: US 11,765,067 B1
(45) Date of Patent: Sep. 19, 2023

(54) METHODS AND APPARATUS FOR MONITORING A SENSOR VALIDATOR

(71) Applicant: Waymo LLC, Mountain View, CA (US)

(72) Inventors: Volodymyr Ivanchenko, Woodside, CA (US); Volker Grabe, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 49 days.

(21) Appl. No.: 17/131,388

(22) Filed: Dec. 22, 2020

Related U.S. Application Data

(60) Provisional application No. 62/954,445, filed on Dec. 28, 2019.

(51) Int. Cl.
*H04L 43/50* (2022.01)
*H04L 67/12* (2022.01)
*H04L 43/065* (2022.01)
*B60W 60/00* (2020.01)
*B60W 50/02* (2012.01)
(Continued)

(52) U.S. Cl.
CPC ......... *H04L 43/50* (2013.01); *B60W 50/0205* (2013.01); *B60W 50/045* (2013.01); *B60W 50/14* (2013.01); *B60W 60/001* (2020.02); *B60W 60/005* (2020.02); *H04L 43/065* (2013.01); *H04L 67/12* (2013.01);
(Continued)

(58) Field of Classification Search
None
See application file for complete search history.

(56) References Cited

U.S. PATENT DOCUMENTS

| | | |
|---|---|---|
| 6,594,620 B1 | 7/2003 | Qin et al. |
| 8,396,611 B2 | 3/2013 | Sawyer et al. |
| (Continued) | | |

FOREIGN PATENT DOCUMENTS

| | | |
|---|---|---|
| CN | 106840242 A | 6/2017 |
| KR | 20190012954 A | 2/2019 |
| (Continued) | | |

OTHER PUBLICATIONS

Wei Zhou, et al., "Autoated Evaluation of Semantic Segmentation Robustness for Autonomous Driving," arXiv:1810.10193 [cs.CV], Oct. 24, 2018.

(Continued)

*Primary Examiner* — Ranodhi Serrao
(74) *Attorney, Agent, or Firm* — McDonnell Boehnen Hulbert & Berghoff LLP

(57) ABSTRACT

A method includes monitoring, at a computing device, outputs of a sensor validator. Each output is generated by the sensor validator based on corresponding sensor data from a sensor coupled to an autonomous vehicle, and each output indicates whether the corresponding sensor data is associated with an event. The method also includes mutating, at the computing device, particular sensor data to generate mutated sensor data that is associated with a particular event. The method further includes determining, at the computing device, a performance metric associated with the sensor validator based on a particular output generated by the sensor validator. The particular output is based on the mutated sensor data.

19 Claims, 8 Drawing Sheets

(51) Int. Cl.
*B60W 50/04* (2006.01)
*B60W 50/14* (2020.01)

(52) U.S. Cl.
CPC ... *B60W 2050/146* (2013.01); *B60W 2420/42* (2013.01); *B60W 2420/52* (2013.01)

(56) References Cited

U.S. PATENT DOCUMENTS

| | | | |
|---|---|---|---|
| 8,838,322 B1 | 9/2014 | Feguson et al. | |
| 9,547,989 B2* | 1/2017 | Fairfield | G08G 1/161 |
| 9,555,740 B1 | 1/2017 | Urmson et al. | |
| 9,684,836 B1* | 6/2017 | Ferguson | G06T 7/74 |
| 9,940,761 B2 | 4/2018 | Pickover et al. | |
| 9,952,317 B2 | 4/2018 | Bradley et al. | |
| 10,095,236 B1 | 10/2018 | Ferguson et al. | |
| 10,228,693 B2* | 3/2019 | Micks | G05D 1/0088 |
| 10,235,629 B2* | 3/2019 | Lemmer | G06F 18/214 |
| 10,268,203 B2* | 4/2019 | Wisniowski | G01S 7/497 |
| 10,303,178 B1 | 5/2019 | Gutmann | |
| 10,388,157 B1* | 8/2019 | Hayes | G06V 20/588 |
| 10,397,019 B2* | 8/2019 | Hartung | H04L 12/40 |
| 10,453,275 B2 | 10/2019 | Tatourian | |
| 10,468,062 B1 | 11/2019 | Levinson et al. | |
| 10,471,966 B2 | 11/2019 | Dudar | |
| 10,832,093 B1* | 11/2020 | Taralova | G06F 18/217 |
| 10,866,584 B2* | 12/2020 | Cella | G06N 3/02 |
| 2015/0254986 A1* | 9/2015 | Fairfield | G05D 1/0287 707/687 |
| 2016/0035081 A1* | 2/2016 | Stout | G06V 20/58 382/103 |
| 2016/0358088 A1* | 12/2016 | Lemmer | G06V 10/764 |
| 2017/0023945 A1 | 1/2017 | Szczodrak et al. | |
| 2017/0092131 A1* | 3/2017 | Fairfield | G08G 1/096775 |
| 2017/0139411 A1* | 5/2017 | Hartung | H04L 12/40 |
| 2018/0075538 A1 | 3/2018 | Christensen et al. | |
| 2018/0203445 A1* | 7/2018 | Micks | G06F 30/20 |
| 2018/0276842 A1 | 9/2018 | Parker et al. | |
| 2018/0284749 A1* | 10/2018 | Cella | G05B 23/0229 |
| 2018/0284755 A1* | 10/2018 | Cella | G06N 20/00 |
| 2018/0307238 A1* | 10/2018 | Wisniowski | G05D 1/0246 |
| 2018/0321667 A1* | 11/2018 | Cella | G05B 23/0283 |
| 2018/0349784 A1 | 12/2018 | Zheng et al. | |
| 2019/0033859 A1* | 1/2019 | Kim | B60W 50/0225 |
| 2019/0064811 A1 | 2/2019 | Lin et al. | |
| 2019/0065637 A1* | 2/2019 | Bogdoll | G06N 20/00 |
| 2019/0065933 A1* | 2/2019 | Bogdoll | G06N 3/08 |
| 2019/0092287 A1 | 3/2019 | Langford et al. | |
| 2019/0135300 A1* | 5/2019 | Gonzalez Aguirre | G06N 3/045 |
| 2019/0179979 A1 | 6/2019 | Melick | |
| 2019/0217868 A1 | 7/2019 | Kim et al. | |
| 2019/0220011 A1 | 7/2019 | Della Penna | |
| 2019/0235521 A1* | 8/2019 | Mudalige | G05D 1/0088 |
| 2019/0293772 A1 | 9/2019 | Pfeiffer | |
| 2019/0303759 A1* | 10/2019 | Farabet | G06N 3/063 |
| 2019/0304206 A1 | 10/2019 | Schmitz et al. | |
| 2020/0096989 A1* | 3/2020 | Cella | G06V 10/7784 |
| 2020/0184236 A1* | 6/2020 | Aguiar | G05D 1/0088 |
| 2020/0250363 A1* | 8/2020 | Partridge | G06F 30/15 |
| 2020/0355810 A1* | 11/2020 | Meng | G01S 7/52004 |
| 2021/0027111 A1* | 1/2021 | Taralova | G06T 17/05 |
| 2021/0065473 A1* | 3/2021 | Diehl | B60W 50/023 |
| 2021/0094540 A1* | 4/2021 | Bagschik | G06F 11/3013 |
| 2021/0097148 A1* | 4/2021 | Bagschik | G06F 30/20 |

FOREIGN PATENT DOCUMENTS

| | | |
|---|---|---|
| WO | 2018225067 A1 | 12/2018 |
| WO | 2019072674 A1 | 4/2019 |
| WO | 2019194698 A1 | 10/2019 |

OTHER PUBLICATIONS

Ulrich Jumar, et al., "A Validation Sensor Based on Carbon-Fiber-Reinforced Plastic for Early Activation of Automotive Occupant Restraint Systems," Journal of Sensors and Sensor Systems, Jan. 10, 2019, vol. 8, Issue 1, Gottingen.

Miguel Realpe, et al., "A Fault Tolerant Perception System for Autonomous Vehicles," 2016 35th Chinese Control Conferences (CCC), Jul. 31, 2016.

* cited by examiner

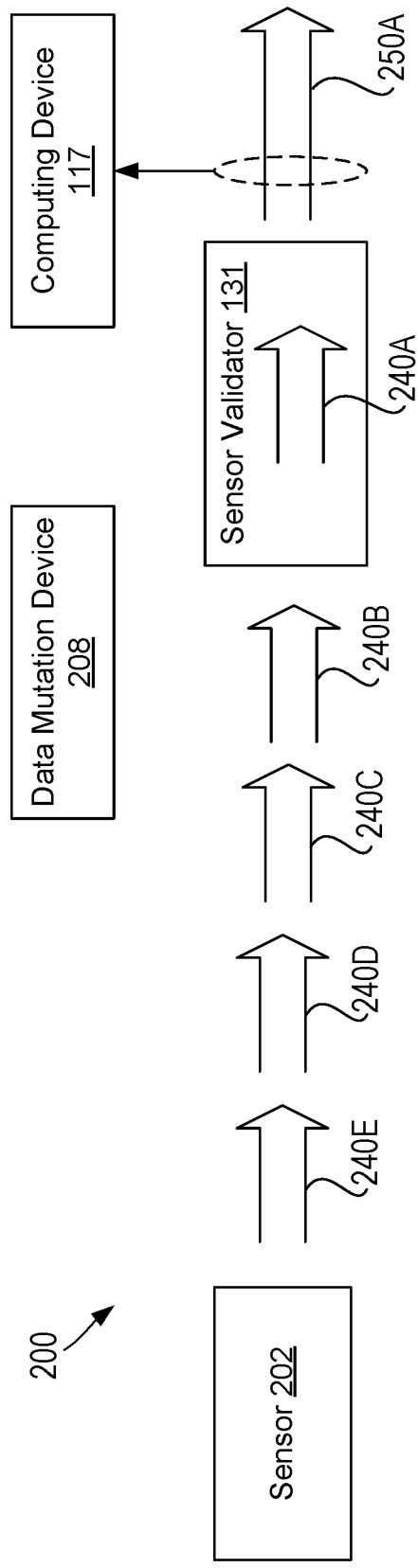
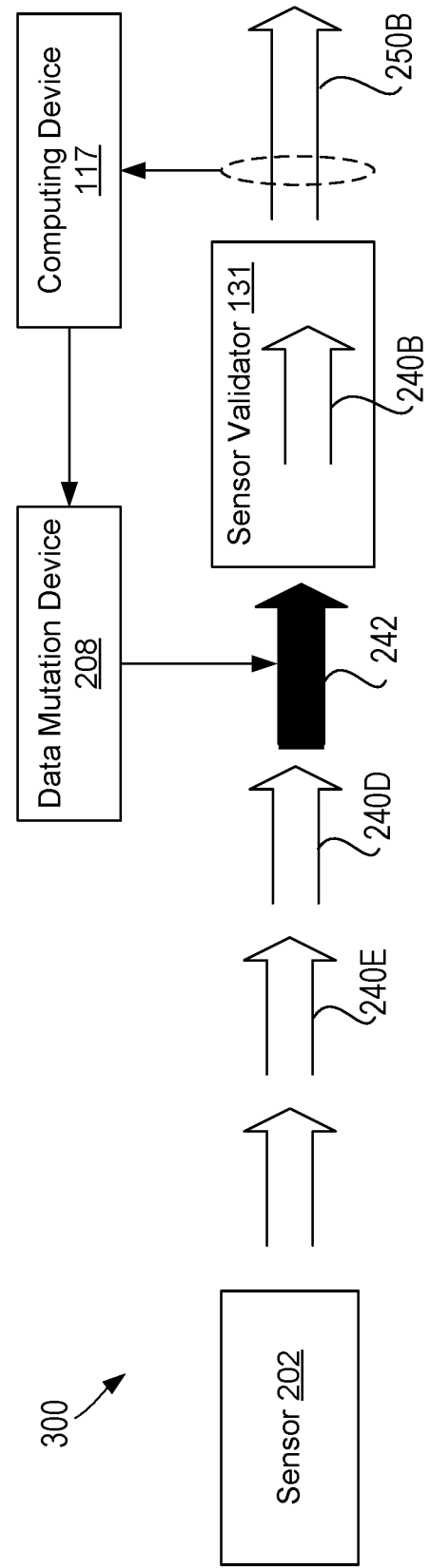
Figure 2
Figure 3

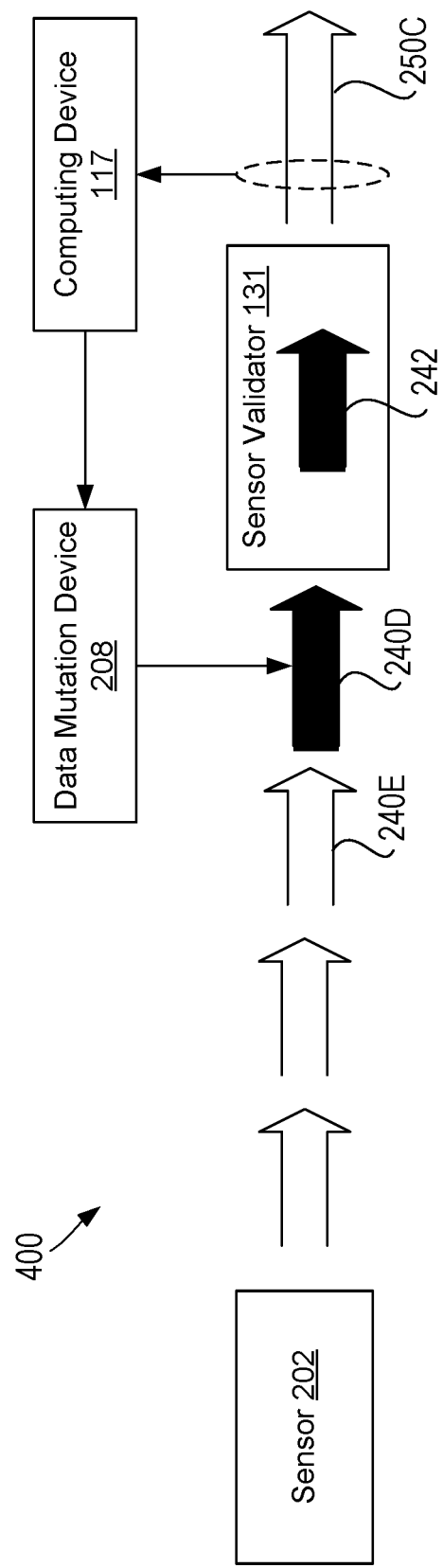

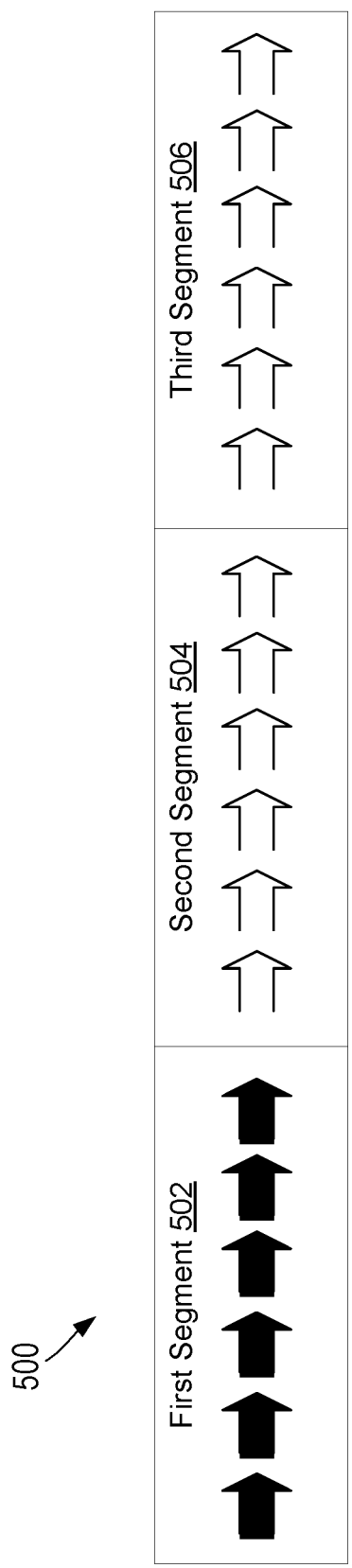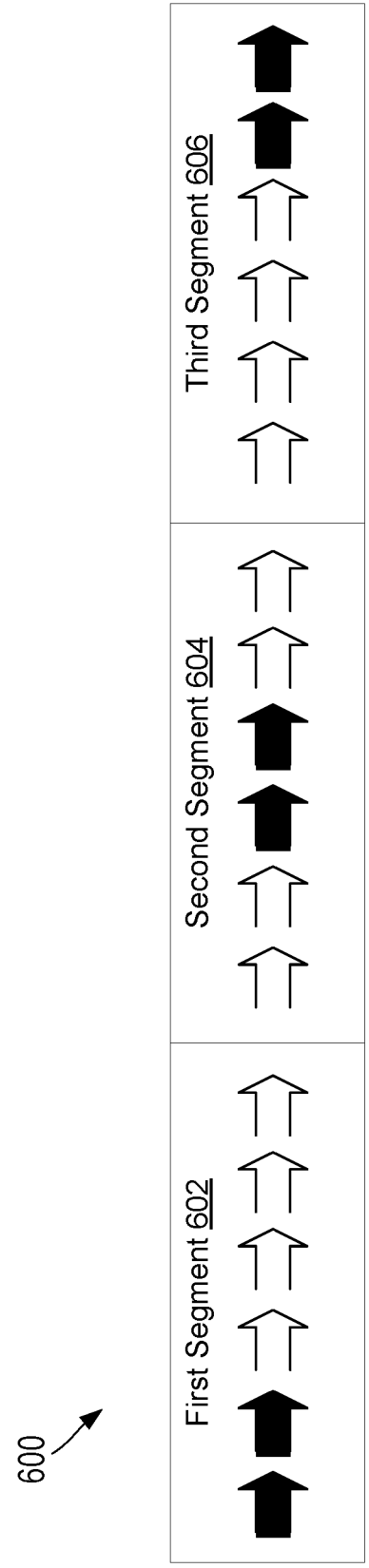

METHODS AND APPARATUS FOR MONITORING A SENSOR VALIDATOR

CROSS-REFERENCE TO RELATED APPLICATIONS

The present application claims priority from U.S. Provisional Patent Application No. 62/954,445, filed Dec. 28, 2019 and entitled "Methods and Apparatus for Monitoring a Sensor Validator," the contents of which are incorporated herein in their entirety.

BACKGROUND

Autonomous vehicles or vehicles operating in an autonomous mode may be equipped with one or more sensors configured to detect information about an environment in which the vehicle operates. For example, light detection and ranging (lidar) devices, radio detection and ranging (radar) devices, and/or cameras may be used to capture data of the environment surrounding autonomous vehicles. In order to accurately detect the surroundings of the vehicle, sensors of the vehicle may undergo testing and verification to maintain proper performance and adherence to specifications.

Sensor validators can be used to detect erroneous sensor readings, especially sensor readings detrimental to perception, such as misalignment, excessive noise, dirty apertures, etc. However, if there is a fault with the sensor validator, erroneous sensor readings may not be readily detected.

SUMMARY

The present disclosure generally relates to determining a performance metric of a sensor validator by mutating (e.g., altering, changing, replacing, etc.) sensor data provided to the sensor validator and monitoring an output of the sensor validator to determine whether the output is reflective of the mutated sensor data. Mutating the sensor data enables testing of the sensor validator in scenarios where there is a relatively small amount of data in logs generated from natural sensor problems. In some implementations, the sensor data can be mutated offline. The mutated sensor data could simulate a sensor problem or an adverse sensor event (i.e., a perceptual condition that impacts an ability of the sensor to capture its surroundings). The perceptual condition can include sensor misalignment, excessive noise, a dirty aperture, debris, etc. By mutating the sensor data, the magnitude and properties of the simulated sensor problem can be controlled.

Upon processing the mutated sensor data, if the output of the sensor validator indicates an occurrence of the sensor event (e.g., indicates that the mutated sensor data is invalid), then the performance metric of the sensor validator may be considered satisfactory. For example, the sensor validator can be determined to have a satisfactory (e.g., reliable) true positive detection rate. The overall reliability of the sensor validator can be based on the true positive detection rate, a false positive detection rate, and latency. A high positive detection rate improves the overall reliability of the sensor validator.

If the output of the sensor validator fails to indicate the occurrence of the sensor event upon processing the mutated sensor data, troubleshooting operations can be performed on the sensor validator to improve the performance metric. In some implementations, large volumes of sensor data can be mutated at variable instances to compensate for adverse sensor events that infrequently occur in real sensor data. By mutating large volumes of sensor data at variable instances and updating the performance metric based on the mutations, the performance metric can indicate the performance of the sensor validator over a relatively large range of miles.

In a first aspect, a method includes monitoring, at a computing device, outputs of a sensor validator. Each output is generated by the sensor validator based on corresponding sensor data from a sensor coupled to an autonomous vehicle, and each output indicates whether the corresponding sensor data is associated with an event. The method also includes mutating, at the computing device, particular sensor data to generate mutated sensor data that is associated with a particular event. The method further includes determining, at the computing device, a performance metric associated with the sensor validator based on a particular output generated by the sensor validator. The particular output is based on the mutated sensor data.

In a second aspect, a system includes a sensor, a sensor validator, and a computing device. The sensor is configured to detect a property associated with a surrounding of an autonomous vehicle. The sensor is also configured to generate sensor data representative of each detection. The sensor validator is configured to receive the sensor data from the sensor and generate outputs indicating whether corresponding sensor data is associated with an event. The computing device is configured to mutate particular sensor data to generate mutated sensor data that is associated with a particular event. The computing device is also configured to determine a performance metric associated with the sensor validator based on a particular output generated by the sensor validator. The particular output is based on the mutated sensor data.

In a third aspect, a non-transitory computer-readable medium stores instructions that are executable by a computing device to cause the computing device to perform functions. The functions include monitoring outputs of a sensor validator. Each output is generated by the sensor validator based on corresponding sensor data from a sensor coupled to an autonomous vehicle, and each output indicates whether the corresponding sensor data is associated with an event. The functions also include mutating particular sensor data to generate mutated sensor data that is associated with a particular event. The functions further include determining a performance metric associated with the sensor validator based on a particular output generated by the sensor validator. The particular output is based on the mutated sensor data.

Other aspects, embodiments, and implementations will become apparent to those of ordinary skill in the art by reading the following detailed description, with reference where appropriate to the accompanying drawings.

BRIEF DESCRIPTION OF THE DRAWINGS

FIG. 2 is a diagram illustrating a system that is operable to monitor a sensor validator in accordance with an example embodiment.

FIG. 3 is a diagram illustrating a system that is operable to monitor a sensor validator in accordance with an example embodiment.

FIG. 4 is a diagram illustrating a system that is operable to monitor a sensor validator in accordance with an example embodiment.

FIG. 5 is a diagram illustrating a process of mutating sensor data in accordance with an example embodiment.

FIG. 6 is a diagram illustrating a process of mutating sensor data in accordance with an example embodiment.

DETAILED DESCRIPTION

Figure 1:
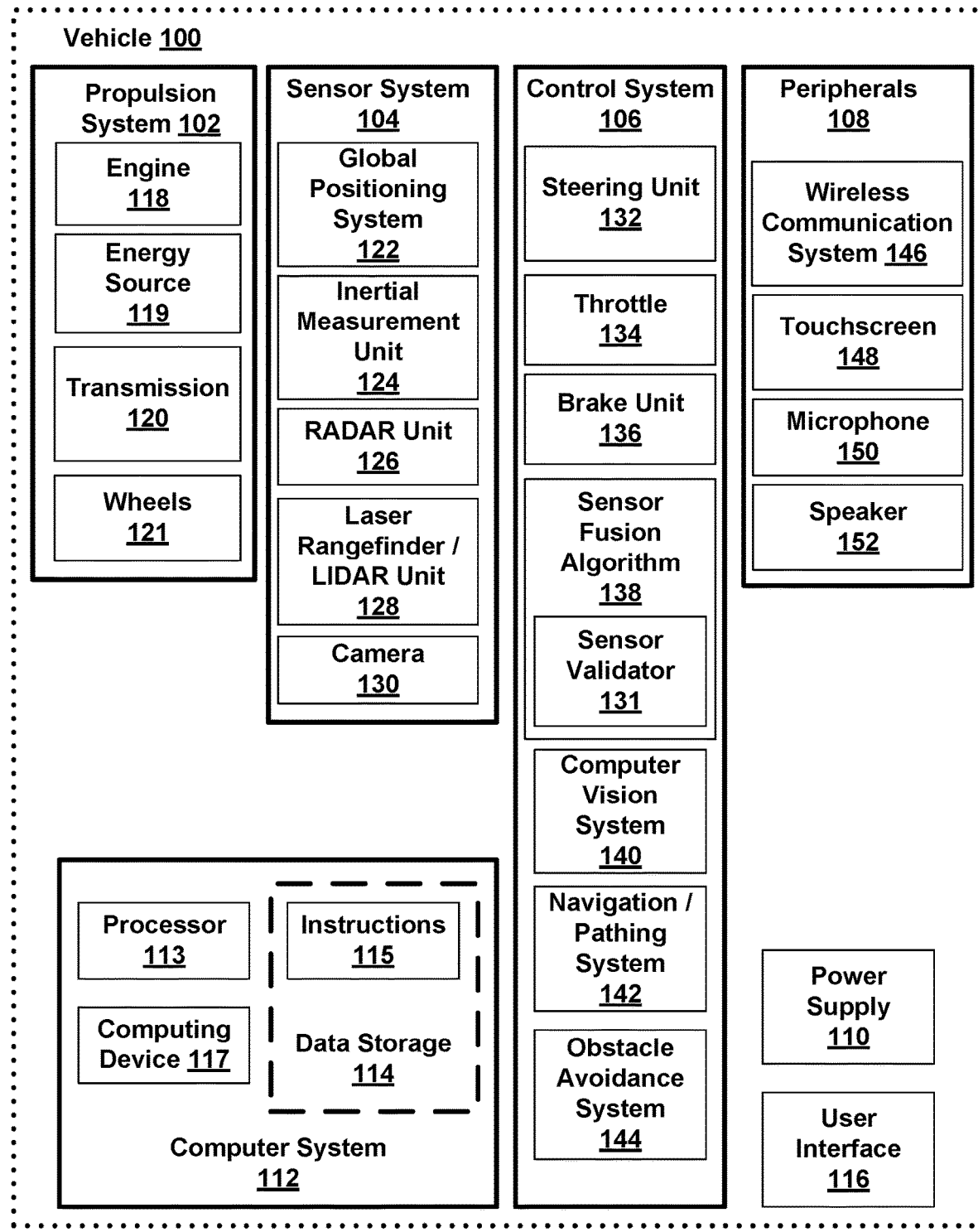
FIG. 1 is a functional block diagram illustrating a vehicle in accordance with an example embodiment.
Figure 7A:
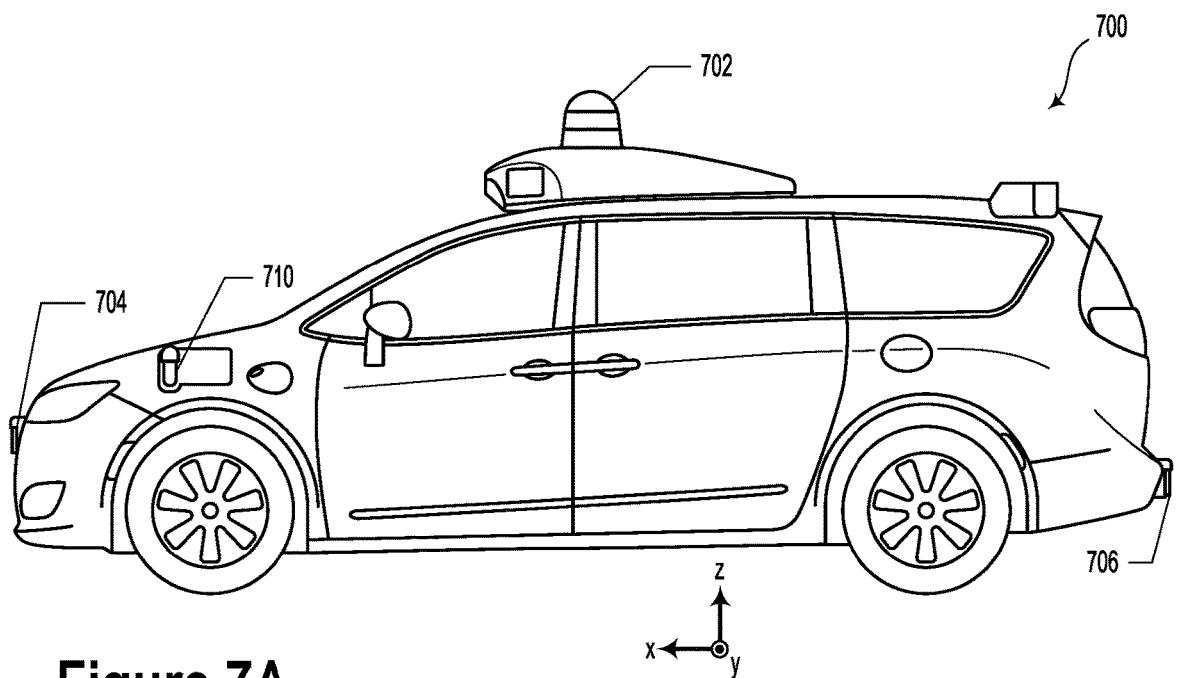
FIG. 7A illustrates a vehicle, according to an example embodiment.
Figure 7B:
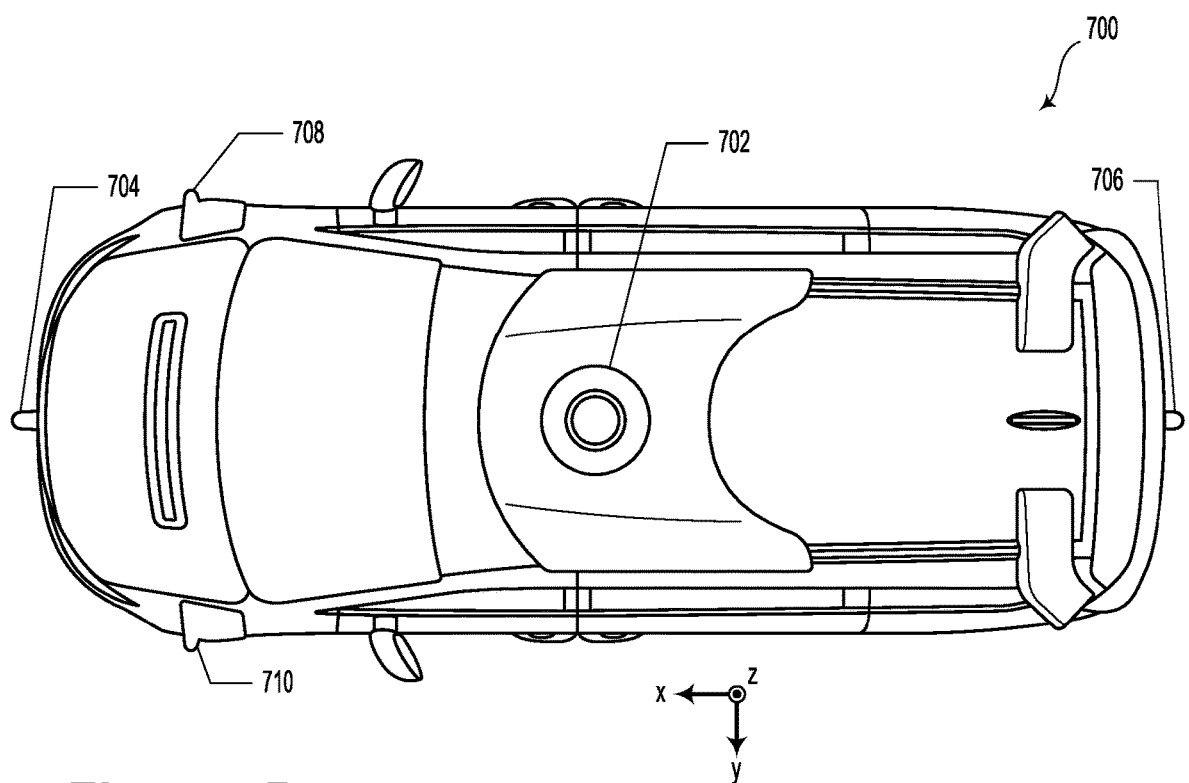
FIG. 7B illustrates a vehicle, according to an example embodiment.
Figure 7C:
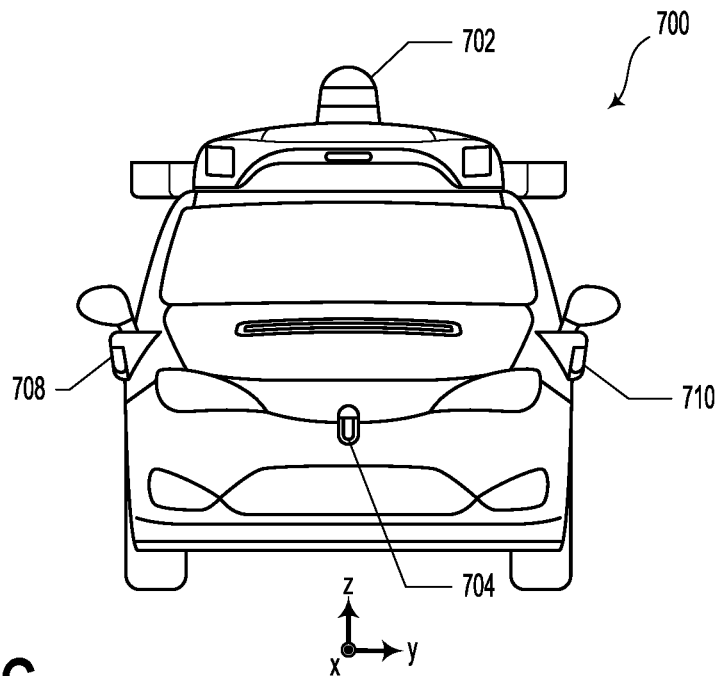
FIG. 7C illustrates a vehicle, according to an example embodiment.
Figure 7D:
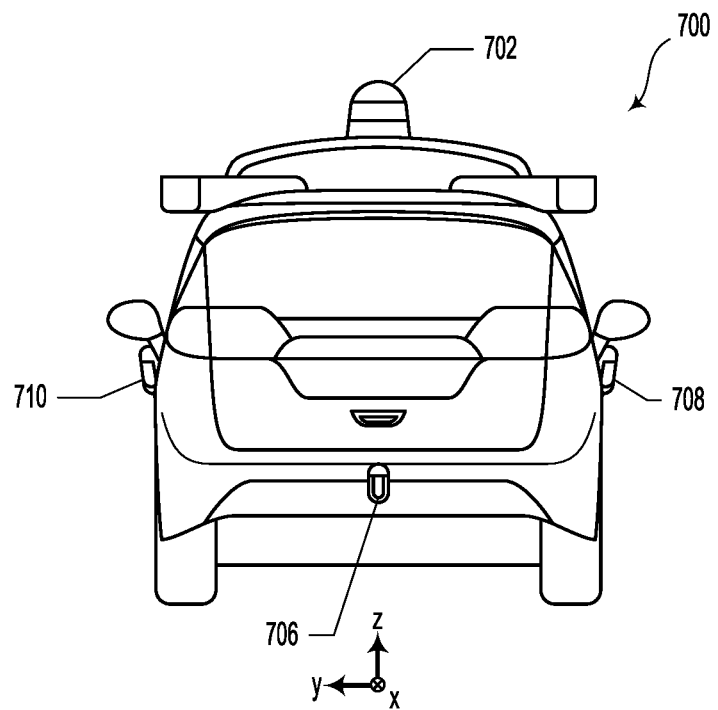
FIG. 7D illustrates a vehicle, according to an example embodiment.
Figure 7E:
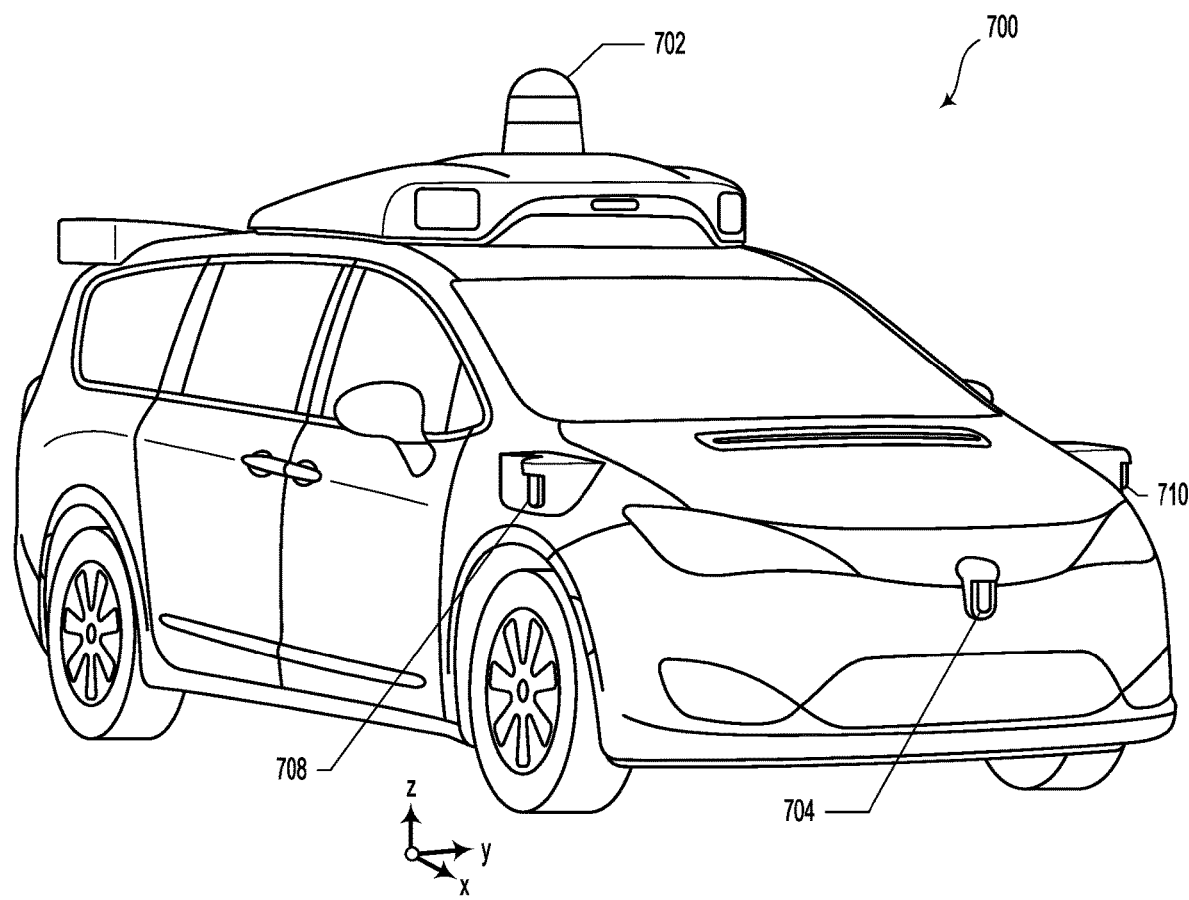
FIG. 7E illustrates a vehicle, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A sensor, such as a sensor mounted on an autonomous vehicle, may capture surroundings of the autonomous vehicle and generate sensor data representative of the captured surroundings. The sensor data can be used by a control system of the autonomous vehicle to steer the vehicle in an autonomous mode and perform other functions in an autonomous mode. For example, the control system can use the sensor data to avoid obstacles, obey signs and traffic signals, perform turns and other maneuvers, and otherwise control motion of the vehicle while the vehicle is controlled in an autonomous mode.

Defects associated with the sensor can cause the sensor to generate erroneous sensor data that does not accurately reflect the surroundings of the autonomous vehicle. For example, if the sensor is subject to misalignment, excessive noise, dirty apertures, etc., the sensor may generate sensor data that does not accurately reflect the surroundings of the autonomous vehicle. As a result, the control system may steer the vehicle based on erroneous sensor readings, which can become increasingly dangerous.

A sensor validator is configured to detect problems (e.g., misalignment, excessive noise, dirty apertures, etc.) with the sensor. For example, the sensor validator can receive sensor data generated by the sensor and, based on the sensor data, generate an output indicating whether the sensor data is valid, invalid, or inconclusive. If the sensor validator detects a sensor problem or a "positive event," the output of the sensor validator indicates an invalid state. In example embodiments, a performance metric of the sensor validator could be based on a true positive event detection rate, a false positive event detection rate, and latency. As used herein, a true positive detection rate corresponds to a rate in which an invalid state is accurately detected by the sensor validator, a false positive event detection rate corresponds to a rate in which an invalid state is inaccurately detected by the sensor validator, and latency corresponds to a delay associated with detecting an invalid state. In example embodiments, the false positive detection rate is estimated at scale to determine the performance metric of the sensor validator. For example, if the sensor validator inaccurately detects invalid states at a high rate, then the performance metric could be relatively low. However, determining the performance metric by heavily relying on the false positive detection rate, while substantially ignoring the true positive detection rate, may result in a performance metric that is not truly representative of the sensor validator. For example, the rate at which the sensor validator accurately detects an invalid state would not be factored into the performance metric.

The present disclosure provides techniques for estimating the true positive detection rate at scale by performing one or more mutations. As used herein, a mutation corresponds to an injection of a positive event into the sensor data. As described below, a data mutation device can inject a positive event into sensor data provided to the sensor validator, and a computing device can monitor the output of the sensor validator to determine whether the output indicates an invalid state. For example, if the sensor validator detects the positive event injected into the sensor data, the output of the sensor validator will indicate an invalid state and the true positive event detection rate of the sensor validator will increase. However, if the sensor validator fails to detect the positive event injected into the sensor data, the output of the sensor validator will indicate a valid state (or an inconclusive state) and the true positive event detection rate of the sensor validator will decrease.

In some scenarios, the detection rate for positive events injected into the sensor data can be determined based on a detection probability (e.g., or likelihood of detection) over a plurality of injected frames and a corresponding latency. As a non-limiting example, assume that a positive event is injected into one-hundred (100) frames of sensor data. If the sensor validator detects at least one injected frame indicating a positive event ninety percent (90%) of the time that the positive event is injected into one-hundred (100) frames, the detection probability is equal to ninety percent (90%). The latency corresponds to the amount of time to achieve a particular detection probability. As a non-limiting example, a latency of four (4) seconds could indicate that it takes an average of four (4) seconds to achieve a particular detection probability, such as seventy-five percent (75%).

The positive event mutations can be distributed according to different patterns or sequences to determine the true positive event detection rate at scale. For example, a positive event mutation can be inserted anywhere in a simulated run segment to allow the sensor validator to detect (or fail to detect) the true positive event once per segment, avoiding overestimation.

II. Example Embodiments

FIG. 1 is a functional block diagram illustrating a vehicle 100 in accordance with an example embodiment. The vehicle 100 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 100 may be configured to operate fully or partially in an autonomous mode. For example, the vehicle 100 may control itself while in the autonomous mode, and may be operable to determine a current state of the vehicle 100 and its environment, determine a predicted behavior of at least one other vehicle in the environment, determine a confidence level that may correspond to a likelihood of the at least one other vehicle to perform the predicted behavior, and control the vehicle 100 based on the determined information. While in the autonomous mode, the vehicle 100 may be configured to operate without human interaction.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components or combined into fewer functional or physical components. In some further examples, additional functional and physical components may be added to the examples illustrated by FIG. 1.

The propulsion system 102 may include components operable to provide powered motion for the vehicle 100. In an example embodiment, the propulsion system 102 may include an engine 118, an energy source 119, a transmission 120, and wheels 121. The engine 118 may be any combination of an internal combustion engine, an electric motor, a steam engine, or other types of engines or motors. In some example embodiments, the engine 118 may be configured to convert the energy source 119 into mechanical energy. In some example embodiments, the propulsion system 102 may include multiple types of engines or motors. For instance, a gas-electric hybrid car could include a gasoline engine and an electric motor. Other examples are possible.

The energy source 119 may represent a source of energy that may, in full or in part, power the engine 118. That is, the engine 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, or flywheels. The energy source 119 may also provide energy for other systems of the vehicle 100.

The transmission 120 may include elements that are operable to transmit mechanical power from the engine 118 to the wheels 121. To this end, the transmission 120 could include a gearbox, a clutch, and drive shafts. The transmission 120 may include other elements. The drive shafts may include one or more axles that could be coupled to the one or more wheels 121.

The wheels 121 of the vehicle 100 may be tires. The wheels 121 of the vehicle 100 may be configured in various formats, including a unicycle, bicycle, tricycle, or a four-wheel format, such as on a car or a truck, for example. Other wheel geometries are possible, such as those including six or more wheels. Any combination of the wheels 121 may be operable to rotate differentially with respect to other wheels 121. The wheels 121 may represent at least one wheel that is fixedly attached to the transmission 120 and at least one tire coupled to a rim of the wheel that could make contact with the driving surface. The wheels 121 may include a combination of metal and rubber, or another combination of materials.

The sensor system 104 may include a number of sensors configured to sense information about an environment of the vehicle 100. For example, the sensor system 104 may include a Global Positioning System (GPS) 122, an inertial measurement unit (IMU) 124, a RADAR unit 126, a laser rangefinder/LIDAR unit 128, and a camera 130. The sensor system 104 may also include sensors configured to monitor internal systems of the vehicle 100 (e.g., an 02 monitor, a fuel gauge, an engine oil temperature). Other sensors are possible as well. One or more of the sensors included in the sensor system 104 may be configured to be actuated separately or collectively in order to modify a position, an orientation, or both, of the one or more sensors.

The GPS 122 may be any sensor configured to estimate a geographic location of the vehicle 100. To this end, the GPS 122 may include a transceiver operable to provide information regarding the position of the vehicle 100 with respect to Earth. The IMU 124 may include any combination of sensors (e.g., accelerometers and gyroscopes) configured to sense position and orientation changes of the vehicle 100 based on inertial acceleration. The RADAR unit 126 may represent a system that utilizes radio signals to sense objects within the local environment of the vehicle 100. In some embodiments, in addition to sensing the objects, the RADAR unit 126 may additionally be configured to sense the speed and the heading of the objects. Similarly, the laser rangefinder or LIDAR unit 128 may be any sensor configured to sense objects in the environment in which the vehicle 100 is located using lasers. In an example embodiment, the laser rangefinder/LIDAR unit 128 may include one or more laser sources, a laser scanner, and one or more detectors, among other system components. The laser rangefinder/LIDAR unit 128 could be configured to operate in a coherent (e.g., using heterodyne detection) or an incoherent detection mode. The camera 130 may include one or more devices configured to capture a plurality of images of the environment of the vehicle 100. The camera 130 may be a still camera or a video camera.

The control system 106 may be configured to control operation of the vehicle 100 and its components. Accordingly, the control system 106 may include various elements such as a steering unit 132, a throttle 134, a brake unit 136, a sensor fusion algorithm 138, a computer vision system 140, a navigation/pathing system 142, and an obstacle avoidance system 144. The control system 106 may additionally or alternatively include components other than those shown and described.

The steering unit 132 may represent any combination of mechanisms that may be operable to adjust the heading of vehicle 100. The throttle 134 may be configured to control, for instance, the operating speed of the engine 118 and, in turn, control the speed of the vehicle 100. The brake unit 136 could include any combination of mechanisms configured to decelerate the vehicle 100. The brake unit 136 could use friction to slow the wheels 121. In other embodiments, the brake unit 136 may convert the kinetic energy of the wheels 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, a Bayesian network, or other algorithm. The sensor fusion algorithm 138 may further provide various assessments based on data from the sensor system 104. In an example embodiment, the assessments may include evaluations of individual objects or features in the environment of the vehicle 100, evaluation of a particular situation, and evaluate possible impacts based on the particular situation. Other assessments are possible.

According to one implementation, the sensor fusion algorithm 138 includes a sensor validator 131. As described in further detail with respect to FIGS. 2-4, the sensor validator 131 is configured to process sensor data from the sensor system 104 (or simulated sensor data during testing) and determine whether the sensor data is valid, invalid, or inconclusive. Invalid sensor data is representative of an "event" or "positive event." The terms "event" and "positive event" are used interchangeably. As used herein, an "event" corresponds to any perceptual problem with a sensor that may impact the ability of a sensor, such as the RADAR unit 126, the LIDAR unit 128, or the camera 130, to capture the surrounding environment of the vehicle. For example, an "event" can correspond to sensor misalignment, excessive noise, dirty apertures, etc. Thus, as a non-limiting example, an event may occur if debris partially covers a lens of a sensor and prevents the sensor from accurately capturing the surrounding environmental conditions. The sensor validator 131 is configured to generate an output indicating whether corresponding sensor data is valid, invalid, or inconclusive. As a non-limiting example, in a scenario where sensor data indicates a substantially dark frame has been captured by the sensor (e.g., indicating that debris partially covered the lens of the sensor), if the sensor validator 131 is properly functioning, the output should indicate that the sensor data is invalid.

The computer vision system 140 may be any system operable to process and analyze images captured by the camera 130 in order to identify objects or features in the environment of the vehicle 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc. According to some embodiments, the sensor validator 131 can be integrated into the computer vision system 140.

The navigation and pathing system 142 may be any system configured to determine a driving path or route for the vehicle 100. The navigation and pathing system 142 may additionally be configured to update the driving path dynamically while the vehicle 100 is in operation. In some embodiments, the navigation and pathing system 142 may be configured to incorporate data from the sensor fusion algorithm 138, the GPS 122, and one or more predetermined maps so as to determine the driving path for the vehicle 100. The obstacle avoidance system 144 may represent a control system configured to identify, evaluate, and avoid or otherwise negotiate potential obstacles in the environment of the vehicle 100.

Peripherals 108 may be configured to allow interaction between the vehicle 100 and external sensors, other vehicles, other computer systems, a user, or a combination thereof. For example, the peripherals 108 may include a wireless communication system 146, a touchscreen 148, a microphone 150, and a speaker 152.

In an example embodiment, the peripherals 108 may provide, for instance, means for a user of the vehicle 100 to interact with the user interface 116. To this end, the touchscreen 148 may display textual, graphic, or other visual information to a user of the vehicle 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the vehicle 100 to communicate with devices within its environment. The microphone 150 may be configured to receive audio (e.g., a voice command or other audio input) from a user of the vehicle 100. Similarly, the speakers 152 may be configured to output audio to a user of the vehicle 100.

In one example, the wireless communication system 146 may be configured to wirelessly communicate with one or more devices directly or via a communication network. For example, the wireless communication system 146 could use 3G cellular communication, such as CDMA, EVDO, GSM/GPRS, or 4G cellular communication, such as WiMAX or LTE. Alternatively, the wireless communication system 146 may communicate with a wireless local area network (WLAN), for example, using WiFi. In some embodiments, the wireless communication system 146 may communicate directly with a device, for example, using an infrared link, Bluetooth, or ZigBee. Other wireless protocols, such as various vehicular communication systems, are possible within the context of the disclosure. For example, the wireless communication system 146 may include one or more dedicated short range communications (DSRC) devices that may include public or private data communications between vehicles and/or roadside stations.

The power supply 110 may provide power to various components of the vehicle 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and the energy source 119 could be implemented together, as in some all-electric cars.

Many or all of the functions of the vehicle 100 could be controlled by the computer system 112. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, the data storage 114 may contain instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, or control one or more of the propulsion system 102, the sensor system 104, the control system 106, and the peripherals 108. In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

According to one implementation, the computer system 112 includes a computing device 117 that is operable to determine a performance metric (e.g., a true positive detection rate) associated with the sensor validator 131. For example, as explained with respect to FIGS. 2-4, the computing device 117, or a component responsive to a command from the computing device 117, is operable to mutate (i.e., alter or change) sensor data provided to the sensor validator 131 such that the mutated sensor data corresponds to an event. The computing device 117 can monitor an output of the sensor validator 131 to determine whether the output indicates that the mutated sensor data is valid, invalid, or inconclusive. If the output of the sensor validator 131 indicates that the mutated sensor data is invalid, the computing device 117 can increase the true positive detection rate of the sensor validator 131. However, if the output of the sensor validator 131 indicates that the mutated sensor data is valid or inconclusive, the computing device 117 can decrease the true positive detection rate of the sensor validator 131. In some implementations, the computing device 117 can be integrated into the processor 113.

The vehicle 100 may include a user interface 116 for providing information to or receiving input from a user of the vehicle 100. The user interface 116 may control or enable control of content and the layout of interactive images that may be displayed on the touchscreen 148. Further, the user interface 116 may include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be operable to provide control over many aspects of the vehicle 100 and its subsystems.

Although FIG. 1 shows various components of vehicle 100, i.e., the wireless communication system 146, the computer system 112, the data storage 114, and the user interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up vehicle 100 could be communicatively coupled together in a wired or wireless fashion.

FIG. 2 is a diagram illustrating a system 200 that is operable to monitor a sensor validator in accordance with an example embodiment. Referring to FIG. 2, the system 200 includes a sensor 202, the sensor validator 131, the computing device 117, and a data mutation device 208. The data mutation device 208 could be, for example, integrated into the control system 106 or the computer system 112 depicted in FIG. 1.

According to some implementations, the sensor 202 can include the RADAR unit 126, the LIDAR unit 128, the camera 130, or any other sensor that captures environmental conditions surrounding the vehicle 100. The sensor 202 generates sensor data 240 for each frame of the surrounding environment that is captured. For example, the sensor 202 generates first sensor data 240A corresponding to a first captured frame, second sensor data 240B for a second captured frame, third sensor data 240C for a third captured frame, fourth sensor data 240D for a fourth captured frame, fifth sensor data 240E for a fifth captured frame, etc. The sensor data 240 is provided to the sensor validator 131.

The sensor validator 131 is configured to process the sensor data 240 and determine whether the sensor data 240 is valid, invalid, or inconclusive. Valid sensor data indicates that the sensor 202 is functioning properly, and invalid sensor data indicates an event. As used herein, an "event" corresponds to any perceptual condition that may impact the ability of the sensor 202 to capture the surrounding environment (e.g., misalignment, excessive noise, dirty apertures, etc.). Thus, as a non-limiting example, an event may occur if debris partially covers a lens of the sensor 202 and prevents the sensor 202 from accurately capturing the surrounding environmental conditions. The sensor validator 131 is configured to generate an output 250 indicating whether corresponding sensor data 240 is valid or invalid. As a non-limiting example, in a scenario where the sensor data 240 indicates a substantially dark frame has been captured by the sensor 202 (e.g., indicating that debris partially covers the lens of the sensor 202), if the sensor validator 131 is properly functioning, the output 250 should indicate that the sensor data 240 is invalid.

As illustrated in FIG. 2, the sensor validator 131 generates a first output 250A based on the first sensor data 240A. If the first sensor data 240A is associated with an event and the first output 250A generated by the sensor validator 131 indicates the first sensor data 240A is invalid, the first output 250A is a true positive. However, if the first sensor data 240A is not associated with an event and the first output 250A generated by the sensor validator 131 indicates the first sensor data 240A is invalid, the first output 250A is a false positive. The techniques described herein enable the computing device 117 to verify that the sensor validator 131 is detecting true positives and to generate a relatively accurate true positive detection rate of the sensor validator 131. For example, as described with respect to FIG. 3 and FIG. 4, the computing device 117 can mutate sensor data 240 to indicate an event and verify that the sensor validator 131 is detecting true positives.

FIG. 3 is a diagram illustrating a system 300 that is operable to monitor a sensor validator in accordance with an example embodiment. Referring to FIG. 3, particular sensor data (i.e., the third sensor data 240C) is mutated into mutated sensor data 242. For example, the computing device 117 sends a signal to the data mutation device 208 that commands the data mutation device 208 to alter the third sensor data 240C to reflect the occurrence of an event. Mutating the third sensor data 240C can include generating sensor data that is indicative of a frame generated by a misaligned sensor, a sensor subject to excessive noise, a sensor having a dirty aperture, etc. Thus, the data mutation device 208 mutates (i.e., alters, changes, drops, or replaces) the third sensor data 240C to generate the mutated sensor data 242 that is associated with an event. In some embodiments, the computing device 117 can directly mutate the third sensor data 240C without the data mutation device 208. By mutating the third sensor data 240C, the computing device 117 can determine whether the sensor validator 131 generates an accurate output when the mutated sensor data 242 is processed, as described with respect to FIG. 4.

FIG. 4 is a diagram illustrating a system 400 that is operable to monitor a sensor validator in accordance with an example embodiment. Referring to FIG. 4, the computing device 117 is configured to determine a performance metric associated with the sensor validator 131 based on a particular output 250C generated by the sensor validator 131. The particular output 250C is based on the mutated sensor data 242. If the particular output 250C indicates that the mutated sensor data 242 is invalid, the computing device 117 can increase a true positive detection rate (i.e., a performance metric) of the sensor validator 131.

As illustrated with respect to FIGS. 5-6, multiple samples of sensor data can be mutated and processed in a similar manner to determine whether the true positive detection rate satisfies a threshold. According to one implementation, the threshold can be a percentage that, when satisfied, enables the vehicle 100 to continuously operate in an autonomous mode. However, when the threshold is not satisfied, the computing device 117 prompts the vehicle 100 to switch to a user assist mode. A non-limiting example of a threshold for the true positive detection rate is ninety-five (95) percent.

Thus, the computing device 117 can determine whether the performance metric associated with the sensor validator 131 satisfies the threshold (i.e., is relatively accurate). For example, the computing device 117 can verify that the sensor validator 131 is detecting true positives at a rate that is satisfactory for operating vehicle 100 in an autonomous mode. By mutating sensor data to control when the sensor data should reflect an event, the computing device 117 can accurately estimate a true positive detection rate at the sensor validator 121 in a relatively short period of time and without having to wait for actual events to occur.

Thus, the techniques described with respect to FIGS. 2-4 enables the computing device 117 to verify whether the sensor validator 131 is properly functioning by determining the true positive detection rate (i.e., the performance metric) of the sensor validator 131. In response to a determination the true positive detection rate fails to satisfy the threshold (i.e., the sensor validator 131 is not properly functioning), the computing device 117 can perform functions to alert the user of the vehicle 100. For example, the computing device 117 can generate an alert in response to a determination that the performance metric fails to satisfy the threshold. The computing device 117 can display the alert at a display device of the vehicle 100. According to one implementation, the display device can correspond to the user interface 116 of FIG. 1 or the touchscreen 148 of FIG. 1. Additionally, or in the alternative, the computing device 117 can generate a command to operate the vehicle 100 in a user assist mode (as opposed to an autonomous mode) in response to a determination that the performance metric fails to satisfy the threshold.

According to some implementations, the computing device 117 is configured to determine lighting conditions, or other peripheral conditions, surrounding the vehicle 100 prior to mutating the third sensor data 240C. The lighting conditions surrounding the vehicle may affect the true positive detection rate at the sensor validator 117. To illustrate, if the lighting conditions are relatively dark, it may be increasingly difficult for the sensor validator 117 to determine whether the sensor data is valid or invalid. For example, debris partially covering a lens of the sensor 202 (i.e., an "event") may result in generation of sensor data that is substantially similar to sensor data indicative of darker surrounding conditions. As a result, it can become increasingly difficult for the sensor validator 117 to determine whether sensor data is indicative of an event or indicative of dark surrounding conditions, which in turn may affect the true positive detection rate. To circumvent this scenario, the computing device 117 can determine to mutate the third sensor data 240C in response to a determination that the lighting conditions satisfy a brightness threshold.

FIG. 5 is a diagram illustrating a process 500 of mutating sensor data in accordance with an example embodiment. The process 500 described with respect to FIG. 5 can be performed by the control system 106, the computer system 112, the computing device 117, the data mutation device 208, or a combination thereof.

In FIG. 5, sensor data is mutated according to a first distribution pattern. To illustrate, the first distribution pattern includes three run segments that are depicted as a first segment 502, a second segment 504, and a third segment 506. Each run segment 502-506 can correspond to a particular period of time, a particular distance travelled, or a number of frames. As a non-limiting example, each run segment 502-506 can correspond to different three hour time spans that the vehicle 100 is in operation. As another non-limiting example, each run segment 502-506 can correspond to different fifty-mile portions of a trip traveled by the vehicle 100. In the illustrative example of FIG. 5, each segment 502-506 includes five samples of sensor data, such as the sensor data 240 illustrated in FIG. 2. Thus, the sensor 202 captures the environment surrounding the vehicle and generates sensor data during each run segment 502-506. Although the sensor data is described as being generated by the sensor 202, in other implementations, the sensor data can be simulated during testing to determine the performance metric of the sensor validator 131. Additionally, although five samples of sensor data are illustrated per segment 502-506, in other implementations, each segment can include additional (or fewer) samples of sensor data. According to some implementations, each segment 502-506 can include thousands or millions of sensor samples.

To mutate sensor data according to the first distribution pattern, the data mutation device 208 mutates positive events into each sample of sensor data in the first segment 502 and bypasses data mutation of positive events in the other segments 504-506. Thus, in the first segment 502, from left to right, the sensor data in a first position of the first segment 502 is mutated to indicate an event, the sensor data in a second position of the first segment 502 is mutated to indicate an event, the sensor data in a third position of the first segment 502 is mutated to indicate an event, the sensor data in a fourth position of the first segment 502 is mutated to indicate an event, and the sensor data in a fifth position of the first segment 502 is mutated to indicate an event.

FIG. 6 is a diagram illustrating a process 600 of mutating sensor data in accordance with an example embodiment. The process 600 described with respect to FIG. 6 can be performed by the control system 106, the computer system 112, the computing device 117, the data mutation device 208, or a combination thereof.

In FIG. 6, sensor data is mutated according to a second distribution pattern. Similar to the first distribution pattern described with respect to FIG. 5, the second distribution pattern includes three run segments that are depicted as a first segment 602, a second segment 604, and a third segment 606. In the illustrative example of FIG. 6, each segment 602-606 includes five samples of sensor data, such as the sensor data 240 illustrated in FIG. 2. Although five samples of sensor data is illustrated per segment 602-606, in other implementations, each segment can include additional (or fewer) samples of sensor data.

To mutate sensor data according to the second distribution pattern, the data mutation device 208 mutates two samples of sensor data in different positions for each segment 602-606. For example, from left to right, the sensor data in a first position of the first segment 602 and the sensor data in a second position of the first segment 602 are mutated to indicate an event. Additionally, from left to right, the sensor data in a third position of the second segment 604 and the sensor data in a fourth position of the second segment 604 are mutated to indicate an event. In addition, from left to right, the sensor data in a fifth position of the third segment 606 and the sensor data in a sixth position of the third segment 606 are mutated to indicate an event.

In some scenarios, to determine the true positive detection rate at the sensor validator 131, the computing device 117 may be configured to down-weight performance of the sensor validator 131 when the sensor data is mutated according to the first distribution pattern illustrated in FIG. 5 and up-weight performance of the sensor validator 131 when the sensor data is mutated according to the second distribution pattern illustrated in FIG. 6. For example, the true positive detection rate of the sensor validator 131 may be more reliable if the mutated sensor data is distributed once per segment as illustrated in FIG. 6. In the scenario where mutated sensor data is not distributed once per segment, there is an increased likelihood of overestimation of the true positive detection rate at the sensor validator 131.

FIGS. 7A-7E illustrate a vehicle 700, according to an example embodiment. The vehicle 700 could be a semi- or fully-autonomous vehicle. While FIGS. 7A-7E illustrates vehicle 700 as being an automobile (e.g., a minivan), it will be understood that vehicle 700 could include another type of autonomous vehicle, robot, or drone that can navigate within its environment using sensors and other information about its environment.

The vehicle 700 may include one or more sensor systems 702, 704, 706, 708, and 710. In example embodiments, one or more of sensor systems 702, 704, 706, 708, and 710 could include RADAR devices (i.e., the RADAR unit 126), LIDAR devices (i.e., the LIDAR unit 128), cameras (i.e., the camera 130), or other sensors. According to one implementation, one or more of the sensor systems 702, 704, 706, 708, and 710 can correspond to, or operate in a similar manner to, the sensor 202. For example, one or more of the sensor systems 702, 704, 706, 708, and 710 can generate the sensor data 240 and provide the sensor data 240 to the sensor validator 131.

The LIDAR devices of sensor systems 702, 704, 706, 708, and 710 may be configured to rotate about an axis (e.g., the z-axis shown in FIGS. 7A-7E) so as to illuminate at least a portion of an environment around the vehicle 700 with light pulses and detect reflected light pulses. Based on the detection of reflected light pulses, information about the environment may be determined. The information determined from the reflected light pulses may be indicative of distances and directions to one or more objects in the environment around the vehicle 700. For example, the information may be used to generate point cloud information that relates to physical objects in the environment of the vehicle 700. The information could also be used to determine reflective properties of objects in the environment, the material composition of objects in the environment, or other information regarding the environment of the vehicle 700.

The information obtained from one or more of systems 702, 704, 706, 708, and 710 could be used to control the vehicle 700, such as when the vehicle 700 is operating in an autonomous or semi-autonomous mode. For example, the information could be used to determine a route (or adjust an existing route), speed, acceleration, vehicle orientation, braking maneuver, or other driving behavior or operation of the vehicle 700.

III. Example Methods

Figure 8:
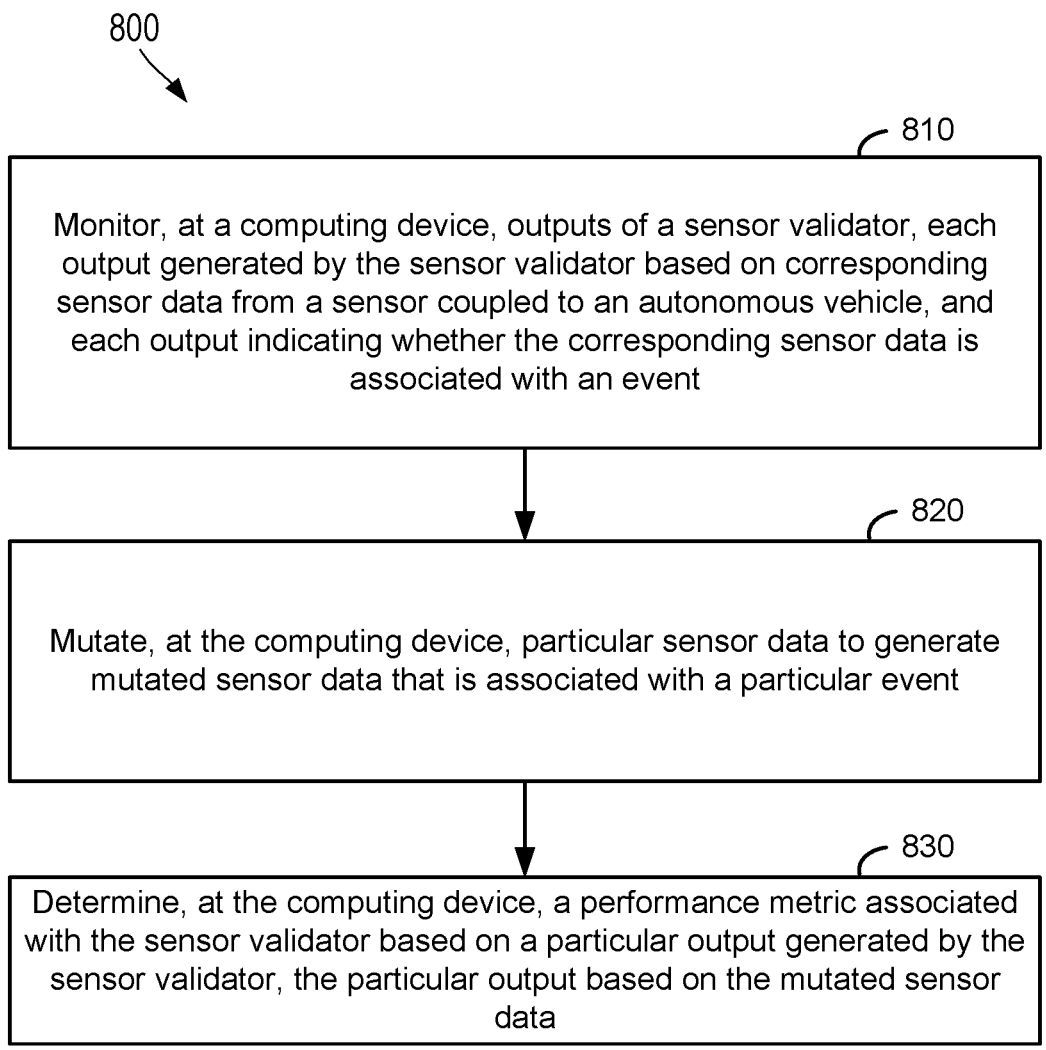
FIG. 8 is a flowchart of a method, according to an example embodiment.

FIG. 8 is a flowchart of a method 800 according to an example embodiment. The method 800 can be performed by the vehicle 100, the sensor system 104, the control system 106, the computer system 112, the systems 200-400, or a combination thereof.

The method 800 includes monitoring, at a computing device, outputs of a sensor validator, at 810. Each output is generated by the sensor validator based on corresponding sensor data from a sensor coupled to an autonomous vehicle, and each output indicates whether the corresponding sensor data is associated with an event. For example, referring to FIG. 2, the computing device 117 monitors outputs, such as the output 250A, of the sensor validator 131. The output 250A is generated by the sensor validator 131 based on corresponding sensor data 240A from the sensor 202. The output 250A indicates whether the sensor data 240A is associated with an event, such as sensor misalignment, excessive noise associated with the sensor 202, a dirty aperture associated with the sensor 202, etc.

The method 800 also includes mutating, at the computing device, particular sensor data to generate mutated sensor data that is associated with a particular event, at 820. For example, referring to FIG. 3, the data mutation device 208 mutates the third sensor data 240C to generate the mutated sensor data 242. According to one implementation, the data mutation device 208 can mutate the third sensor data 240C according to a first mutation type that generates mutated sensor data 242 indicative of a frame captured from a misaligned sensor. According to another implementation, the data mutation device 208 can mutate the third sensor data 240C according to a second mutation type that generates mutated sensor data 242 indicative of a frame captured from a sensor associated with excessive noise. According to yet another implementation, the data mutation device 208 can mutate the third sensor data 240C according to a third mutation type that generates mutated sensor data 242 indicative of a frame captured from a sensor that has a dirty aperture. The mutation type performed by the data mutation device 208 can be indicated by the computing device 117.

The method 800 also includes determining, at the computing device, a performance metric associated with the sensor validator based on a particular output generated by the sensor validator, at 830. The particular output is based on the mutated sensor data. For example, referring to FIG. 4, the computing device 117 monitors the output 250C associated with the mutated sensor data 242 to determine whether the sensor validator 131 detected the particular event from the mutated sensor data 242. If the output 250C indicates that the sensor validator 131 detected the particular event from the mutated sensor data 242, the performance metric (i.e., the true positive detection rate) is increased. According to one implementation, the performance metric satisfies a threshold in response to the output 250C indicating that the mutated sensor data 242 is associated with the particular event. The performance metric can correspond to a detection rate based on mutated events.

According to one implementation, the method 800 can also include monitoring outputs of the sensor validator based on non-mutated sensor data (e.g., "normal" sensor data). Each time an output of the sensor validator indicates an event based on non-mutated sensor data, the method 800 can include verifying whether an event actually occurred. As a non-limiting example, the computing device 117 can provide the non-mutated sensor data to another sensor validator with increased computing resources to verify whether the non-mutated sensor data is associated with an event. In the scenario that the other sensor validator determines that the non-mutated sensor data is not associated with an event, the computing device 117 can adjust (e.g., increase) a second performance metric of the sensor validator. The second performance metric can correspond to a false alarm rate based on non-mutated sensor data.

According to one implementation, the method 800 can include generating, at the computing device, an alert in response to a determination that the performance metric fails to satisfy the threshold. For example, if the true positive detection rate falls below the threshold, the computing device 117 can generate an alert that indicates as much. The method 800 can also include displaying the alert at a display device in the autonomous vehicle. For example, the computing device 117 can display the alert at the touchscreen 148 or the user interface 116.

According to one implementation, the method 800 can include generating a command to operate the autonomous vehicle in a user assist mode in response to a determination that the performance metric fails to satisfy the threshold. For example, the computing device 117 can generate a command that is provided to the control system 106 to operate the vehicle 100 in a user assist mode, as opposed to an autonomous mode.

According to one implementation, the method 800 includes mutating, at the computing device, second particular sensor data to generate second mutated sensor data that is associated with the particular event. For example, the computing device 117 or the data mutation device 208 can mutate additional sensor data, as illustrated in FIGS. 5 and 6, to generate corresponding mutated sensor data that is associated with the particular event. The method 800 can also include adjusting, at the computing device, the performance metric associated with the sensor validator based on a second particular output generated by the sensor validator. The second particular output is based on the second mutated data. For example, computing device 117 can monitor the outputs of the sensor validator 131 to determine whether the sensor validator 131 detected the corresponding mutated sensor data.

Thus, the method 800 described with respect to FIG. 8 enables the computing device 117 to verify whether the sensor validator 131 is properly functioning by determining the performance metric of the sensor validator 131. In response to a determination that the sensor validator 131 is not properly functioning, the computing device 117 can perform functions to alert the user of the vehicle 100 or switch the vehicle to a user assist mode.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
   monitoring, at a computing device, outputs of a sensor validator, wherein each output generated by the sensor validator is based on corresponding sensor data from a sensor coupled to an autonomous vehicle and indicates whether the corresponding sensor data is associated with an event that corresponds to a perceptual problem with the sensor;
   mutating, at the computing device, particular sensor data to generate mutated sensor data that simulates a particular event, wherein the particular event includes at least one of a misalignment of the sensor or a dirty aperture associated with the sensor;
   determining, at the computing device, a performance metric associated with the sensor validator based on a particular output generated by the sensor validator, the particular output based on the mutated sensor data; and
   generating, at the computing device, an alert in response to a determination that the performance metric fails to satisfy a threshold, wherein the performance metric fails to satisfy the threshold based on the particular output failing to indicate that the mutated sensor data is associated with the particular event.

2. The method of claim 1, further comprising:
   displaying the alert at a display device in the autonomous vehicle.

3. The method of claim 2, further comprising generating a command to operate the autonomous vehicle in a user assist mode in response to the determination that the performance metric fails to satisfy the threshold.

4. The method of claim 1, wherein the performance metric is based on a true positive event detection rate of the sensor validator.

5. The method of claim 4, wherein the performance metric is further based on a false positive event detection rate of the sensor validator.

6. The method of claim 1, further comprising:
mutating, at the computing device, second particular sensor data to generate second mutated sensor data that simulates the particular event; and
adjusting, at the computing device, the performance metric associated with the sensor validator based on a second particular output generated by the sensor validator, the second particular output based on the second mutated data.

7. The method of claim 1, further comprising determining, at the computing device, lighting conditions surrounding the autonomous vehicle prior to mutating the particular sensor data, wherein the particular sensor data is mutated in response to a determination that the lighting conditions satisfy a brightness threshold.

8. The method of claim 1, wherein the sensor includes a light detection and ranging (LIDAR) device, a radio detection and ranging (RADAR) device, or a camera.

9. A system comprising:
a sensor configured to:
detect a property associated with a surrounding of an autonomous vehicle; and
generate sensor data representative of each detection;
a sensor validator configured to:
receive the sensor data from the sensor; and
generate outputs indicating whether corresponding sensor data is associated with an event that corresponds to a perceptual problem with the sensor; and
a computing device configured to:
mutate particular sensor data to generate mutated sensor data that simulates a particular event, wherein the particular event includes at least one of a misalignment of the sensor or a dirty aperture associated with the sensor;
determine a performance metric associated with the sensor validator based on a particular output generated by the sensor validator, the particular output based on the mutated sensor data; and
generate an alert in response to a determination that the performance metric fails to satisfy a threshold, wherein the performance metric fails to satisfy the threshold based on the particular output failing to indicate that the mutated sensor data is associated with the particular event.

10. The system of claim 9, further comprising:
a display device configured to display the alert.

11. The system of claim 10, wherein the computing device is further configured to generate a command to operate the autonomous vehicle in a user assist mode in response to the determination that the performance metric fails to satisfy the threshold, and further comprising:
a control system configured to change a mode of the autonomous vehicle into the user assist mode in response to receiving the command.

12. The system of claim 9, wherein the performance metric is based on a true positive event detection rate of the sensor validator.

13. The system of claim 12, wherein the performance metric is further based on a false positive event detection rate of the sensor validator.

14. The system of claim 9, wherein the sensor includes a light detection and ranging (LIDAR) device, a radio detection and ranging (RADAR) device, or a camera.

15. A non-transitory computer-readable medium having stored therein instructions executable by a computing device to cause the computing device to perform functions, the functions comprising:
monitoring outputs of a sensor validator, wherein each output generated by the sensor validator is based on corresponding sensor data from a sensor coupled to an autonomous vehicle and indicates whether the corresponding sensor data is associated with an event that corresponds to a perceptual problem with the sensor;
mutating particular sensor data to generate mutated sensor data that simulates a particular event, wherein the particular event includes at least one of a misalignment of the sensor or a dirty aperture associated with the sensor;
determining a performance metric associated with the sensor validator based on a particular output generated by the sensor validator, the particular output based on the mutated sensor data; and
generating an alert in response to a determination that the performance metric fails to satisfy a threshold, wherein the performance metric fails to satisfy the threshold based on the particular output failing to indicate that the mutated sensor data is associated with the particular event.

16. The non-transitory computer-readable medium of claim 15,
wherein the functions further comprise:
displaying the alert at a display device in the autonomous vehicle.

17. The non-transitory computer-readable medium of claim 16, wherein the functions further comprise generating a command to operate the autonomous vehicle in a user assist mode in response to the determination that the performance metric fails to satisfy the threshold.

18. The non-transitory computer-readable medium of claim 15, wherein the performance metric is based on a true positive event detection rate of the sensor validator.

19. The non-transitory computer-readable medium of claim 18, wherein the performance metric is further based on a false positive event detection rate of the sensor validator.

* * * * *